Patented Mar. 4, 1941

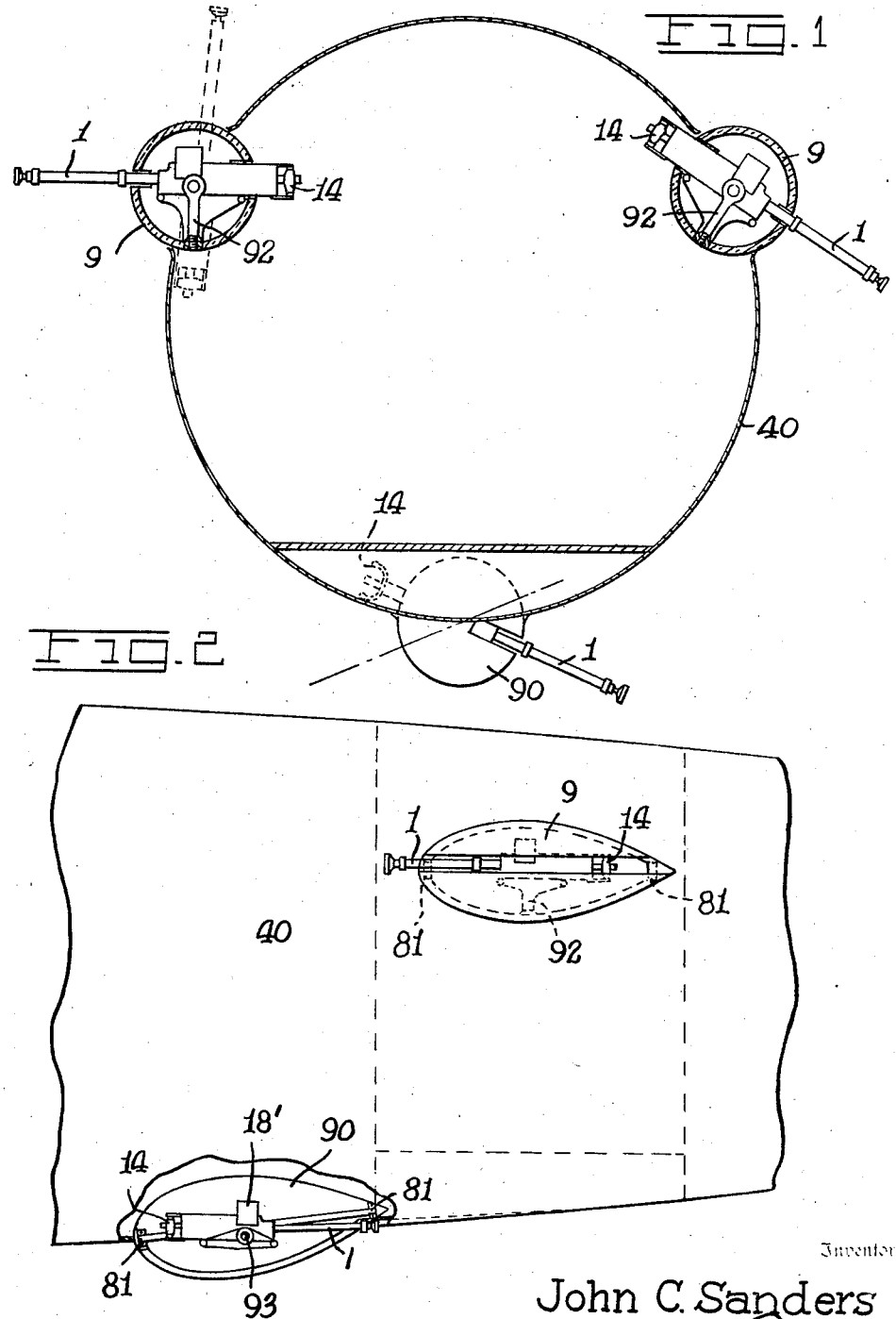

2,233,642

UNITED STATES PATENT OFFICE 2,233,642

LATERAL AIRCRAFT GUN MOUNT

John C. Sanders, Seattle, Wash., assignor, by mesne assignments, to Boeing Aircraft Company, Seattle, Wash., a corporation of Washington Original application October 17, 1934, Serial No. 749,040. Divided and this application December 21, 1936, Serial No. 116,920

17 Claims. (Cl. 89—37.5)

My invention relates to gun emplacements, and especially to those which protrude from a surface of an aircraft body, which surface is one other than a forwardly projecting nose or a rearwardly directed tail, that is, a surface over which movement of the relative air must be facilitated, to avoid drag, which emplacement may take the form of streamlined protuberances protruding laterally from the side of the fuselage.

This application is a division of my application Serial No. 749,040, filed October 17, 1934, now Patent No. 2,113,143, issued April 5, 1938.

The usual type of rear gun installation on a bombing airplane, for example, is a gun carried in a ring mount supported upon the upper edge of an open cockpit, located in the fuselage directly behind the pilot, or on cockpits located in the rear of outboard engine nacelles.

Such installations enable the gunner to fire only above the fuselage, and in a direction somewhat downward therefrom, but a gun mounted in such a support cannot be fired directly beneath the airplane itself, and they can be fired only awkwardly, if at all, in a direction directly above the airplane. There have been provisions made for firing guns through apertures directed rearwardly, at the bottom of a fuselage, but these, having abrupt edges, produce eddies and too high a drag to be permissible.

While some attempts have been made to enclose a gun mounted in an open cockpit, such enclosures have even further restricted the field of fire, and have not been sufficiently mobile to enable the gunner to train the gun freely. Moreover, these shields jut out into the air stream in such a manner as to create a large amount of drag, although probably not as much as that created by a wholly unprotected gunner and gun installation. Never before, so far as I am aware, has it been proposed to enclose such a side gun, as distinguished from a gun operable from a top-opening cockpit, or from a purely rearwardly directed gun.

My gun mount has been designed to provide a laterally disposed emplacement with the gun projected outward sufficiently to enable the gunner to fire readily in any direction within the possible field of fire, upwardly, downwardly, forwardly or rearwardly, and at all times he will be protected from the air blast past the aircraft, and the drag produced by elements projecting outwardly from the streamlined surface of the fuselage will be a minimum. The field of fire which can be covered is also unusually wide, in the neighborhood of a hemisphere for each gun.

It is thus an object of my invention to provide an enclosed gun mount of such aerodynamic efficiency that the gun emplacement, having the gun projected thus to increase its field of fire and each of laying, will add little to the air resistance of the airplane.

It is also an object to dispose several gun installations of the type which I propose in such an arrangement that the several spherical sectors of fire will interlock in a plane transversely of and close to the fuselage, to encircle it with a continuous and unbroken ring or sphere of protection. Such an arrangement will give an aggregate field of fire of at least a hemisphere in extent, from a transverse plane through the fuselage rearwardly, and to a considerable angle forwardly, and by suitable choice of location of each gun relative to the fuselage surface, and of each gun relative to the others, substantially a full sphere of fire may be included.

Other objects flowing from the novel type of gun mount, enclosure therefor, and supporting means for the gun mount and enclosure, as well as from the unique arrangement in which such gun mounts are disposed, will be evident as the description of this specification progresses, when read in the light of the drawing.

My invention comprises the new arrangement of gun mounts at the rear of an airplane fuselage, relative to each other and to the fuselage, together with the unique construction of the individual gun mounts and the enclosures provided therefor, as described hereafter in the specification, shown in the drawing, and defined in the appended claims.

I have illustrated in the drawing an arrangement of gun mounts which will accomplish my purpose, as well as a particular type of gun mount which is well adapted for use in such arrangements. It will be understood, however, that the specific gun mount would be useful in other arrangements, and likewise gun mounts of different construction might be disposed in an arrangement involving the principles of that shown in the drawing.

Figure 1 is a vertical transverse section through an airplane fuselage and gun mounting, and Figure 2 is a side elevation of a rear portion of an airplane fuselage showing my invention.

The particular type of gun mount which I have found to be suitable for my purpose supports a gun 1 for swinging about at least two axes, one defined by the pivot means 81 extending lengthwise of the airplane and lying substantially in the surface thereof, and the other disposed at right angles thereto, and intersecting the first axis substantially in the surface of the fuselage. The latter swinging movement is afforded in the gun mount shown by the pivot 92 or 93. These two axes enable universal movement of the gun, and their location relative to the skin of the fuselage determines the angular extent of the sector of its fire. Since they are both located substantially in the surface or skin of the fuselage, and since the latter is outwardly convex, in all directions, and therefore curves away from these axes, the result is that the gun can be laid substantially directly forwardly or directly rearwardly, and in excess of 45° to each side of an axial plane radially of the fuselage through the gun emplacement—nearly 70°, in fact.

But a gun so located, in an aperture in the skin, or its aperture alone, would produce tremendous drag. To avoid this each gun is received in an enclosure 9 or 90, respectively, formed to surround the entire gun mount and the aperture in the side of the fuselage, through which the gun projects, and through which it is swung and manipulated.

In order that a minimum of air resistance will be created by the gun emplacement, I prefer to form the enclosures 9 or 90 of ovoid shape, protruding from the aircraft structure with their larger ends forward. Thus a fair protuberance is provided, having a substantially tear shaped longitudinal profile which creates very little turbulence in the air stream flowing past it. The aircraft structure opening is always closed by the shell because of the manner in which it is pivotally supported, even when swung to traverse the gun 1 through an angle exceeding 120° in a plane transversely of the fuselage.

Adequate fore and aft movement may be permitted by the provision of a slot extending lengthwise of the enclosure, through which the gun projects. The gun may swing along this slot as it is rotated about the axis 92 or 93. Any gun or guns may be restricted to fire either rearwardly only, or forwardly only, if desired; in any event it should and can cover a field of fire in a fore and aft direction at least from a plane extending transversely of the airplane fuselage through the gun mount to directly rearward or directly forward of the fuselage, and the fore and aft field of fire may, if desired, extend from about directly rearward to about directly forward. The lower gun is preferably not mounted upon a post, such as 92, but upon trunnions 93, which give an equivalent fore and aft swinging movement in order that the ammunition box 18' may be kept above the gun as the shell 90 swings from side to side.

When mounts of the type described or ones giving an equivalent range of fire are disposed in the arrangement illustrated, much better results are obtained than are possible with rear gun installations heretofore known. It will be noted that the several guns are shown as mounted with relation to the contour of the fuselage 40 so that each can cover nearly a hemisphere outward from the plane of the fuselage opening through which it projects, and they afford, in the aggregate, something considerably in excess of a hemisphere of fire. As mentioned, each gun of the three can swing in a direction laterally of the fuselage through an angle in excess of 120°. The respective fields of fire of the three guns therefore form laterally interlocking spherical sectors of fire, which interlock at a comparatively short distance from the airplane fuselage, and which also interlock rearwardly to give complete rear protection, and may as well be able to fire forwardly to an equivalent degree.

In the particular arrangement illustrated these sectors interlock laterally at about a hundred yards from the airplane, so that the combination of guns affords maximum protection in all directions, unless possibly directly forward. If the individual gun mounts did not afford as great a range transversely of the fuselage, additional gun mounts could be disposed about the fuselage to accomplish the same results by insuring that the lateral fields of fire of all adjoining guns interlock, so that in the aggregate they would form a continuous and uninterrupted band of fire encircling the fuselage transversely thereof.

It is evident that each gun may be operated by a separate gunner, or one gunner may fire the particular gun which may best be brought to bear upon the target, changing from one gun to another as may become necessary. Also while the guns are shown only as tiltable about transverse axes, if it should be desired to maintain them always upright, no matter in what direction they may fire, a gimbal mount allowing the gun to rotate about its own axis may be employed, such as shown for example in my Patent No. 2,113,143. The gunner, of course, remains in the fuselage, and grasps the breech end 14 of a gun projecting inward from an enclosure 9 and 90, or by swinging it may move the gun along the slot, or traverse the gun and correspondingly swing the shell. Any suitable support for the gunner, such as the platform shown in Figure 1, may be provided.

What I claim as my invention is:

1. In an airplane fuselage, three protuberances on the sides thereof spaced at angles of approximately 120 degrees about its longitudinal axis, a gun mount housed within and supported from each protuberance to support a gun projecting laterally therefrom, and means guiding each of said protuberances to swing about a longitudinal axis through an angle in excess of 120 degrees, to enable the fields of fire of adjacent guns to overlap in a direction substantially normal to the longitudinal axis of the fuselage.

2. The combination of claim 1, and means supporting each gun mount to swing about an axis transverse to the longitudinal axis of the fuselage through an angle in excess of 90 degrees to enable each gun to fire through a field extending from directly rearward to forward of a plane normal to the longitudinal axis passing through the gun mount.

3. In a surface of an aircraft structure disposed substantially parallel to the direction of flight, a gun mount, a streamlined enclosure therefor protruding laterally from the aircraft structure, and means guiding said enclosure for movement about an axis lying substantially in such surface and directed generally parallel to the direction of flight.

4. In a surface of an aircraft structure disposed substantially parallel to the direction of flight, a gun mount, a streamlined enclosure therefor protruding laterally from the aircraft surface, means guiding said enclosure for movement about an axis lying substantially in such surface, and means supporting said gun mount for swinging with respect to the enclosure about an axis normal to the axis about which said enclosure moves.

5. In a surface of an aircraft structure disposed substantially parallel to the direction of flight, a gun mount, and an enclosure therefor apertured for projection of a gun, outstanding laterally from the aircraft surface as a fair protuberance having a substantially tear-shaped segmental, longitudinal profile, the longitudinal axis whereof lies substantially in the surface of the aircraft structure and is fixed in a position generally parallel to the longitudinal axis of the aircraft structure, the point of the enclosure being directed rearwardly, and means supporting the gun mount for aiming movement of the gun relative to the enclosure.

6. In a streamlined aircraft structure, a gun mount, and an ovoid enclosure therefor formed as a body of revolution, and, protruding laterally from the aircraft structure with its longitudinal generating axis substantially parallel to the direction of flight and its larger end forward, and means guiding the enclosure for rotation about said longitudinal axis.

7. In a streamlined aircraft structure, a gun mount, an ovoid enclosure therefor formed as a body of revolution, and protruding laterally from the aircraft structure with its longitudinal generating axis substantially parallel to the direction of flight and its larger end forward, and having a slot therein for protrusion of a gun barrel therethrough, and pivot means carried by said enclosure and supporting said gun mount for swinging a gun barrel along said slot, and means guiding the enclosure for rotation about said longitudinal axis.

8. In a streamlined aircraft structure, a gun mount, an ovoid enclosure therefor protruding laterally from the aircraft structure with its longitudinal axis substantially parallel to the direction of flight and its larger end forward, and having a longitudinal slot therein for protrusion of a gun barrel therethrough, pivot means carried by said enclosure supporting said gun mount for swinging a gun barrel along said slot, and means supporting said enclosure from said aircraft structure for rotation about its longitudinal axis, to traverse said gun mount.

9. An enclosure protruding laterally from the surface of an aircraft structure which is disposed substantially parallel to the direction of flight, means guiding said enclosure for swinging with respect to the aircraft structure about an axis directed generally parallel to the direction of flight, a gun mount swingable with said enclosure about such axis, and means guiding said gun mount to swing from a position parallel to the direction of flight about an axis substantially intersecting said first axis and disposed substantially parallel to said aircraft structure surface and transversely of the direction of flight, through an angle of at least 90 degrees into a position perpendicular to the direction of flight.

10. In an aircraft structure having a surface disposed generally lengthwise of the direction of flight, and having an aperture, an enclosure projecting from the surface and surrounding the aperture, to protect a gunner within from the air stream, and formed as a fair protuberance having a substantially tear-shaped longitudinal profile with its point directed rearwardly, a gun mount disposed in the aperture, but within the enclosure, the enclosure being apertured for the protrusion and relative movement of a gun upon such mount, and means supporting the gun mount from the aircraft structure for tilting movement about a longitudinal axis lying substantially in the aircraft surface and coinciding with the axis of the protuberance, and for movement about a second axis transverse to the first axis.

11. A gun mount disposed adjacent an opening in the surface of an aircraft, which surface is disposed generally in the direction of flight, a support for said gun mount, carried by the aircraft, formed and arranged for tilting movement of the gun mount and a gun thereon about an axis extending generally in the direction of flight, and substantially disposed in the aircraft surface, and about a second axis, transverse to the first, and means enclosing said gun mount, and swingable therewith about the first-mentioned axis, and slotted for relative movement of the gun mount about the second axis, said enclosing means outstanding laterally from the aircraft surface, and at its rear end being formed as a pointed protuberance faired into such surface to create a minimum of drag.

12. In an airplane fuselage having at least three apertures in its skin approximately equally angularly spaced about its longitudinal axis, a gun mount disposed in each such aperture, to support a gun with its muzzle protruding therefrom, and means guiding each gun mount to swing about an axis generally parallel to said longitudinal axis and so disposed relative to the skin of the fuselage, but not appreciably outwardly of the general local contour of the skin, that each gun may fire in a plane substantially perpendicular to the longitudinal axis of the fuselage and intersecting the fuselage, throughout an angle in such plane sufficiently exceeding the angular spacing of the apertures as to enable the fields of fire of all adjacent guns to overlap.

13. The combination of claim 12, and means supporting each gun mount to swing about a second axis transverse to said first axis of swing to fire throughout an appreciable longitudinal angle, in addition to firing throughout the angle as specified in claim 12.

14. In an airplane fuselage having at least three apertures in its skin approximately equally angularly spaced about its longitudinal axis, a gun mount disposed in each such aperture, to support a gun with its muzzle protruding therefrom, means guiding each gun mount to swing about an axis generally parallel to said longitudinal axis and so disposed relative to the skin of the fuselage, but not appreciably outwardly of the general local contour of the skin, that each gun may fire in a plane substantially perpendicular to the longitudinal axis of the fuselage and intersecting the fuselage, throughout an angle in such plane sufficiently exceeding the angular spacing of the aperture as to enable the fields of fire of all adjacent guns to overlap in such plane, means supporting each gun mount to swing about a second axis transverse to said first axis of swing, to fire throughout an appreciable longitudinal angle, an addition to firing throughout the aforesaid angle, and a corresponding number of fair protuberances, each outstanding from the skin of the fuselage and formed as an elongated body of revolution closely received within the corresponding aperture in the skin, and surrounding the gun mount, each such protuberance being pivoted with its generating axis coaxial with said first axis of swing of its gun mount for swinging movement with the latter about such axis, and being also slotted for swinging of the gun mount and gun about the gun mount's second axis of swing, relative to the protuberance.

15. In a surface of an aircraft structure disposed generally in a fore and aft direction and having an aperture therein, a gun mount pivotally mounted in said aperture for swinging about an axis lying substantially in such surface and directed generally in a fore and aft direction, to support a gun with its muzzle protruding through such aperture, such gun when outwardly directed being swingable between limits where its barrel engages the edge of the aperture, a streamlined enclosure for the gun mount and corresponding part of the gun, said enclosure filling the aperture against entrance of air, and protruding outwardly of the aircraft surface, and means guiding said enclosure for swinging movement coaxially with the gun mount.

16. In a surface of an aircraft structure disposed generally in a fore and aft direction and having an aperture of a length to swing a gun's breech portion therethrough, a gun mount pivotally mounted in said aperture for swinging about a fore and aft axis lying in such surface, and further pivotally mounted for swinging about a second axis transverse to the first, and likewise lying substantially in such surface, and intermediate the ends of the aperture, to support a gun with its muzzle protruding through the aperture, and for swinging movement about each of said axes, limited only by engagement of the barrel with the edge of the aperture, and a streamlined enclosure for the gun mount and coresponding part of the gun, mounted for swinging with the gun mount about the latter's first axis, said enclosure filling the aperture against entrance of air, protruding outwardly of the aircraft surface, to admit the breech portion of the gun when swung relative to the enclosure about the second axis, and the enclosure being slotted lengthwise to permit such swinging of the gun mount and gun relative to the enclosure, without substantial diminution of the limits of that swinging.

17. In combination in an airplane fuselage having at least three apertures spaced circumferentially about it, a gun mount disposed in each aperture, to support a gun with its muzzle protruding therefrom, and means for guiding each mount with the gun supported thereby for swinging movement in directions generally perpendicular to the fore and aft axis of the fuselage, the spacing of said apertures around the fuselage being such, and the gun mounts being so constructed and arranged as to enable the field of fire of each gun to overlap that of each of the two adjacent guns to form a pattern completely surrounding the fuselage when viewed in the fore and aft direction of the fuselage.

JOHN C. SANDERS.